United States Patent
Yuki et al.

(10) Patent No.: US 10,464,214 B2
(45) Date of Patent: Nov. 5, 2019

(54) VOICE INTERACTION DEVICE AND CONTROL METHOD THEREFOR

(71) Applicant: TOYOTA JIDOSHA KABUSHIKI KAISHA, Toyota-shi, Aichi-ken (JP)

(72) Inventors: Mina Yuki, Toyota (JP); Shintaro Yoshizawa, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 155 days.

(21) Appl. No.: 15/676,247

(22) Filed: Aug. 14, 2017

(65) Prior Publication Data

US 2018/0096206 A1 Apr. 5, 2018

(30) Foreign Application Priority Data

Oct. 4, 2016 (JP) .................. 2016-196557

(51) Int. Cl.
| | |
|---|---|
| *B25J 11/00* | (2006.01) |
| *G06F 3/01* | (2006.01) |
| *G06N 3/00* | (2006.01) |
| *B25J 9/16* | (2006.01) |
| *G06K 9/00* | (2006.01) |

(52) U.S. Cl.
CPC ......... *B25J 11/0015* (2013.01); *B25J 9/1697* (2013.01); *B25J 11/0005* (2013.01); *G06F 3/013* (2013.01); *G06K 9/00255* (2013.01); *G06K 9/00597* (2013.01); *G06K 9/00664* (2013.01); *G06N 3/008* (2013.01)

(58) Field of Classification Search
CPC ........ G06F 3/013; G06N 3/004; G06N 3/006; G06N 3/008; B25J 19/023; B25J 9/0003; B25J 9/1697; B25J 11/0005; B25J 11/008; B25J 11/009; B25J 11/0015; Y10S 901/47; G06K 9/00664; G06K 9/00221–9/00315; G06K 9/00597–9/0061
See application file for complete search history.

(56) References Cited

U.S. PATENT DOCUMENTS

| | | |
|---|---|---|
| 2007/0150106 A1 | 6/2007 | Hashimoto et al. |
| 2007/0198128 A1 | 8/2007 | Ziegler et al. |
| 2009/0030552 A1 | 1/2009 | Nakadai et al. |

FOREIGN PATENT DOCUMENTS

| | | |
|---|---|---|
| JP | H9-83856 A | 3/1997 |
| JP | 2002-326176 A | 11/2002 |
| JP | 2002-351305 A | 12/2002 |
| JP | 2003-205489 A | 7/2003 |
| JP | 2004-198656 A | 7/2004 |
| JP | 2005-279895 A | 10/2005 |

(Continued)

*Primary Examiner* — Spencer D Patton
(74) *Attorney, Agent, or Firm* — Sughrue Mion, PLLC

(57) ABSTRACT

Provided is a voice interaction device capable of turning lines of sight of eyes of an interactive robot to a conversation partner without inhibiting voice interaction. The voice interaction device is incorporated in the interactive robot. The voice interaction device includes a photographing unit configured to photograph an image; an environment recognition unit configured to recognize a position of a conversation partner captured in the image; a display unit disposed at positions of the eyes of the interactive robot and configured to display the eyes of the interactive robot; and an eye control unit configured to turn the lines of sight of the eyes of the interactive robot displayed on the display unit to a position where the conversation partner is recognized.

6 Claims, 11 Drawing Sheets

CONVERSATION PARTNER HAS MOVED TO RIGHT SIDE OF IMAGE
→TURN LINES OF SIGHT OF EYES OF ROBOT RIGHTWARD (56) References Cited

FOREIGN PATENT DOCUMENTS

| | | | |
|---|---|---|---|
| JP | 2006-289508 | A | 10/2006 |
| JP | 2007-181888 | A | 7/2007 |
| JP | 2008-18529 | A | 1/2008 |
| JP | 2009-509673 | A | 3/2009 |
| JP | 2010-112979 | A | 5/2010 |
| JP | 2012-138086 | A | 7/2012 |
| JP | 2012-239557 | A | 12/2012 |
| JP | 2014-030865 | A | 2/2014 |

CONVERSATION PARTNER HAS MOVED TO RIGHT SIDE OF IMAGE
→TURN LINES OF SIGHT OF EYES OF ROBOT RIGHTWARD

Fig. 4

CONVERSATION PARTNER HAS MOVED TO RIGHT SIDE OF IMAGE
→TURN LINES OF SIGHT OF EYES OF ROBOT RIGHTWARD

MOVING OBJECT APPEARS ON RIGHT SIDE OF IMAGE
→TURN LINES OF SIGHT OF EYES OF ROBOT RIGHTWARD

VOICE INTERACTION DEVICE AND CONTROL METHOD THEREFOR

CROSS REFERENCE TO RELATED APPLICATIONS

This application is based upon and claims the benefit of priority from Japanese patent application No. 2016-196557, filed on Oct. 4, 2016, the disclosure of which is incorporated herein in its entirety by reference.

BACKGROUND

The present invention relates to a voice interaction device incorporated in an interactive robot, and a control method therefor.

In recent years, a voice interaction device that is incorporated in an interactive robot and performs a voice interaction with a conversation partner has been put into practical use. For example, Japanese Unexamined Patent Application Publication No. 2004-198656 discloses a voice interaction device that turns a line of sight of each eye of an interactive robot to a conversation partner.

SUMMARY

However, in the voice interaction device disclosed in Japanese Unexamined Patent Application Publication No. 2004-198656, the line of sight of each eye of the interactive robot is turned to the conversation partner by moving the neck of the interactive robot using a motor. This causes a problem that a motor driving sound is generated when the neck of the interactive robot is moved, and the driving sound becomes noise that inhibits the voice interaction.

The present invention has been made in view of the above-mentioned problem, and an object of the present invention is to provide a voice interaction device capable of turning lines of sight of eyes of an interactive robot to a conversation partner without inhibiting a voice interaction, and a control method therefor.

A voice interaction device according to one aspect of the present invention is a voice interaction device that is incorporated in an interactive robot, including: a photographing unit configured to photograph an image; an environment recognition unit configured to recognize a position of a conversation partner captured in the image; and a display unit disposed at positions of eyes of the interactive robot and configured to display the eyes of the interactive robot; and an eye control unit configured to turn lines of sight of the eyes of the interactive robot displayed on the display unit to a position where the conversation partner is recognized.

A control method for a voice interaction device according to another aspect of the present invention is a control method for a voice interaction device incorporated in an interactive robot, the control method including: photographing an image; recognizing a position of a conversation partner captured in the image; and turning lines of sight of eyes of the interactive robot to a position where the conversation partner is recognized, the eyes of the interactive robot being displayed on a display unit disposed at positions of the eyes of the interactive robot.

According to the above-mentioned aspects of the present invention, the eyes of the interactive robot are displayed on the display unit and the lines of sight of the eyes of the interactive robot that is displayed on the display unit is turned to a position where the conversation partner is recognized. Accordingly, when the lines of sight of the eyes of the interactive robot are turned to the conversation partner, a motor driving sound is not generated. This provides the advantageous effect that the line of sight of the eyes of the interactive robot can be turned to the conversation partner without inhibiting the voice interaction.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Embodiments of the present invention will be described below with reference to the drawings.

(1) First Embodiment

(1-1) Configuration of First Embodiment

Figure 1:
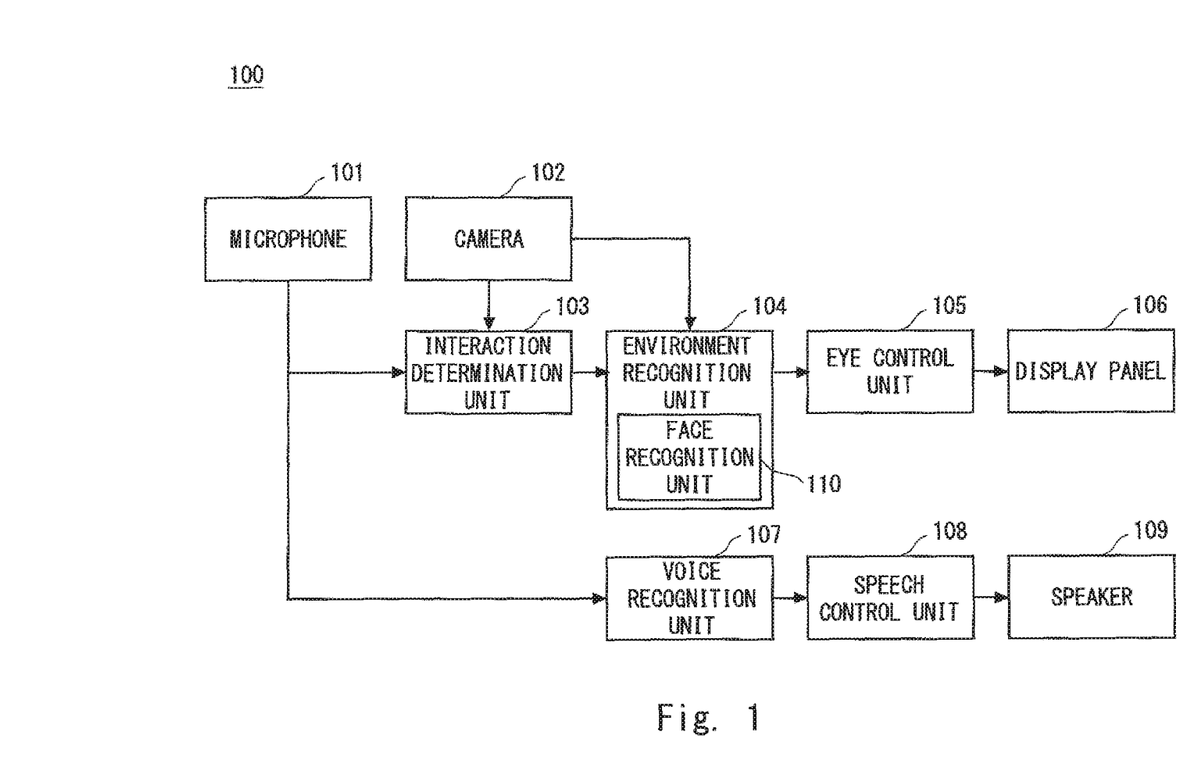
FIG. 1 is a block diagram showing a configuration example of a voice interaction device according to a first embodiment.
Figure 2:
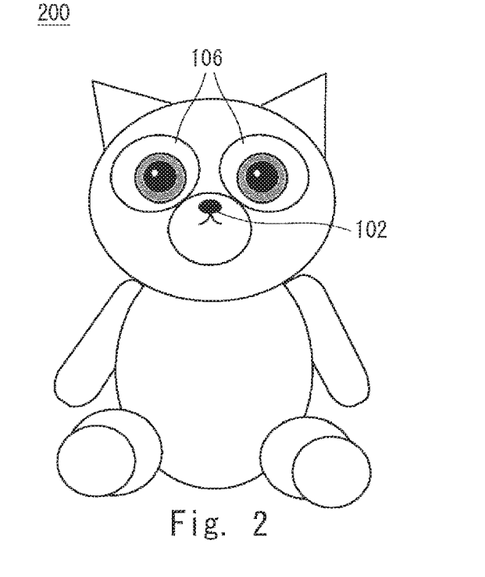
FIG. 2 is a diagram showing an appearance structure example of an interactive robot incorporating a voice interaction device according to first to third embodiments.

First, a configuration of a first embodiment will be described. FIG. 1 is a block diagram showing a configuration example of a voice interaction device 100 according to the first embodiment. FIG. 2 is a diagram showing an example of an appearance structure of an interactive robot 200 incorporating the voice interaction device 100 according to the first embodiment. The interactive robot 200 shown in FIG. 2 is an animal-like robot. However, the appearance structure of the interactive robot 200 is not limited to this.

As shown in FIG. 1, the voice interaction device 100 according to the first embodiment includes a microphone 101, a camera 102, an interaction determination unit 103, an environment recognition unit 104, an eye control unit 105, display panels 106, a voice recognition unit 107, a speech control unit 108, and a speaker 109.

The microphone 101 collects sound such as a speech voice of a conversation partner.

The camera 102 is an example of a photographing unit which photographs the image of the conversation partner and images in the vicinity of the conversation partner. In the first embodiment, the camera 102 is disposed at a position corresponding to the nose of the interactive robot 200. However, the position where the camera 102 is disposed is not limited to this.

The interaction determination unit 103 determines whether or not the interactive robot 200 is making conversation with the conversation partner, based on the collected voice collected by the microphone 101 and the photographed images photographed by the camera 102. In the first embodiment, the interaction determination unit 103 determines that the interactive robot 200 is making conversation with the conversation partner when the volume of the collected voice exceeds a threshold and the conversation partner is included in the photographed image.

When the interaction determination unit 103 determines that the interactive robot 200 is making conversation with the conversation partner, the environment recognition unit 104 recognizes the conversation partner in the photographed image photographed by the camera 102 and the surrounding environment of the conversation partner. In the first embodiment, the environment recognition unit 104 recognizes the position of the conversation partner. More specifically, the environment recognition unit 104 recognizes the position of the face of the conversation partner. Accordingly, the environment recognition unit 104 includes a face recognition unit 110 which is an example of a first recognition unit. The face recognition unit 110 recognizes the position of the face of the conversation partner in the photographed image. For example, the face recognition unit 110 can recognize the position of the face of the conversation partner based on a feature point of the face of the conversation partner in the photographed image.

When the conversation partner is specified, for example, when the conversation is started, the face recognition unit 110 may specify, as the conversation partner, a person in the photographed image, and may continuously track the person. Further, the face recognition unit 110 may specify, as the conversation partner, a person whose face is the largest among the faces of the persons in the photographed image (i.e., a person located at a position closest to the interactive robot 200). When determining whether or not an object in the photographed image is a person, the face recognition unit 110 may determine that the photographed object is a person if the feature point of the face of the person can be detected by, for example, a face recognition technique that is used for a digital camera and the like. In the case of specifying the conversation partner, the face recognition unit 110 may use a difference between the background image photographed in advance by the camera 102 (the image of the environment in which the interactive robot 200 is installed) and the image currently being photographed. In other words, the face recognition unit 110 may specify the conversation partner as described above in the object obtained as the difference.

The display panels 106 are respectively located at positions corresponding to the eyes of the interactive robot 200, and display the eyes of the interactive robot 200. The display panels 106 are, for example, liquid crystal panels or organic EL (Electro Luminescence) panels, and are an example of a display unit.

Figure 3:
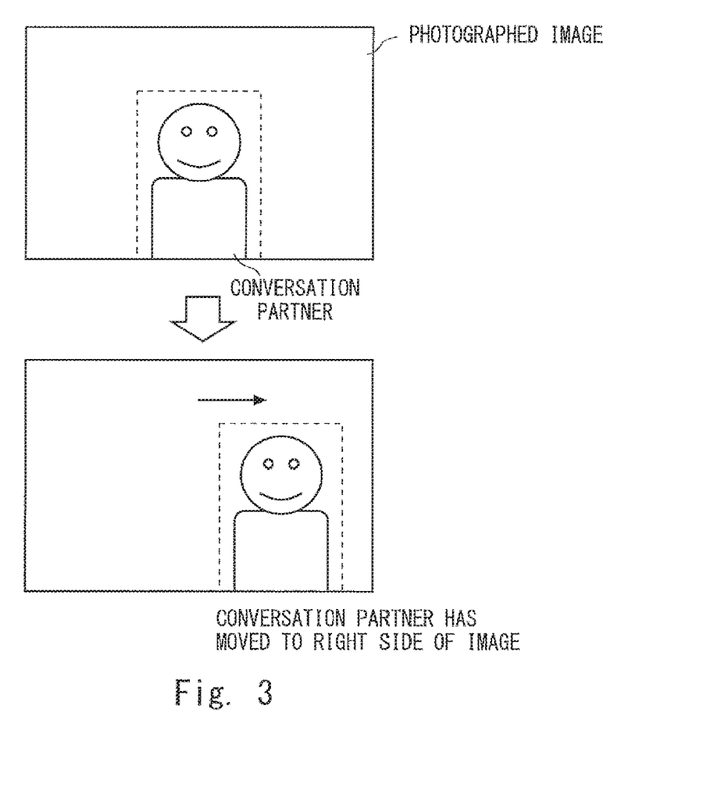
FIG. 3 is a diagram showing an example in which a conversation partner has moved to the right side of a photographed image.
Figure 4:
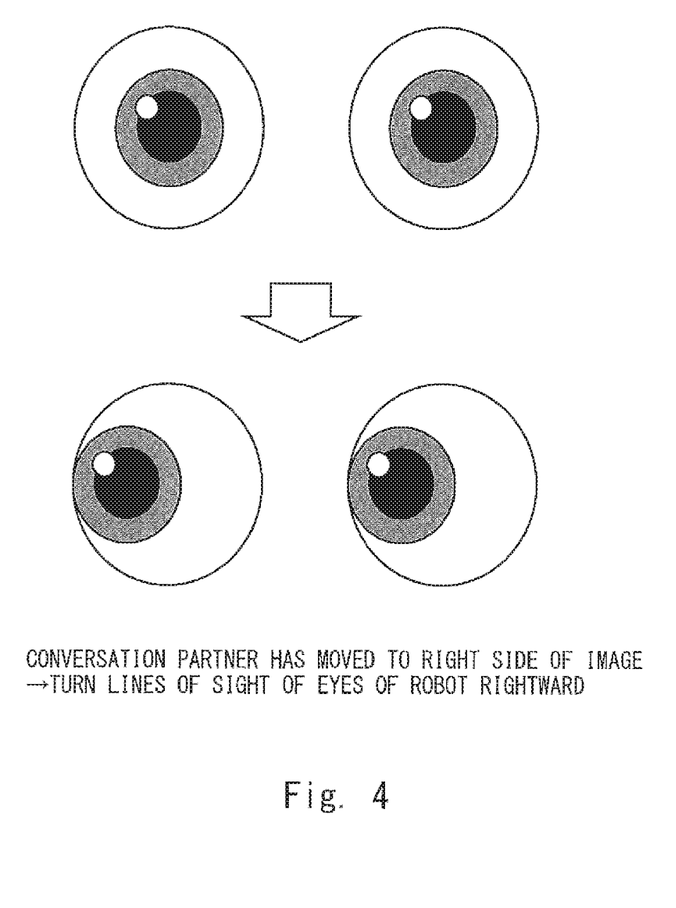
FIG. 4 is a diagram showing an example in which lines of sight of eyes of the interactive robot is turned to the conversation partner located on the right side of the photographed image.
Figure 5:
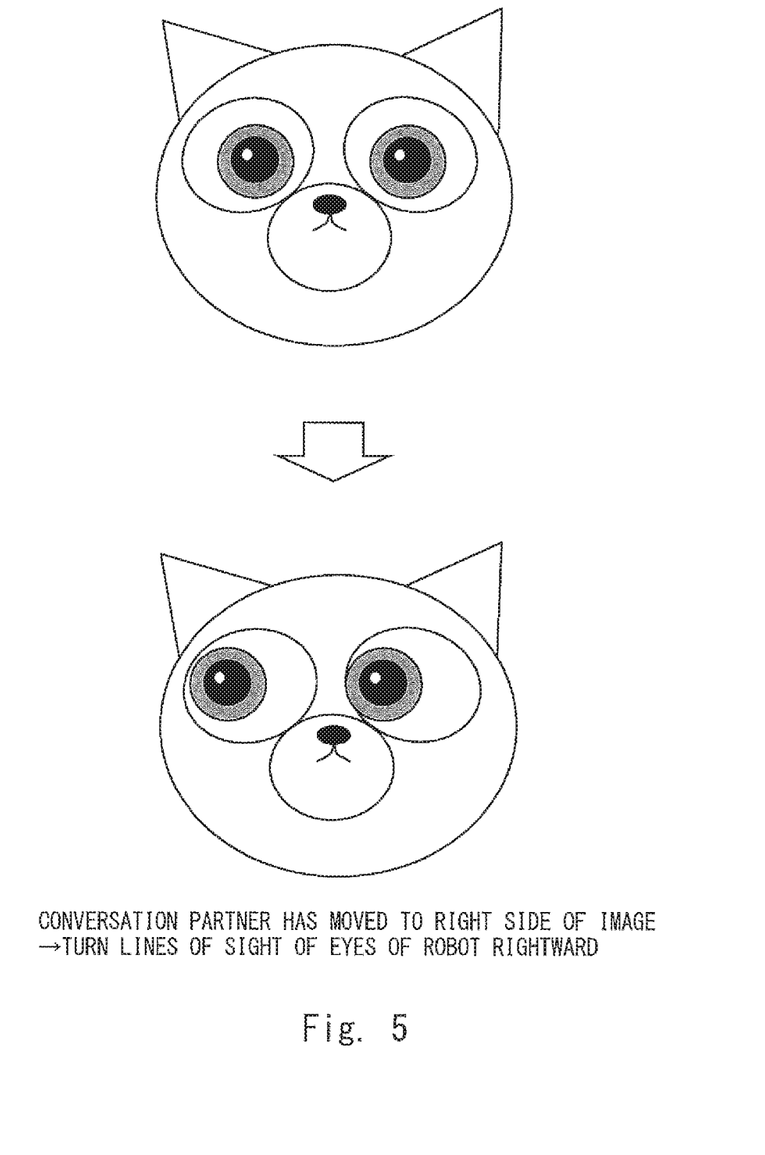
FIG. 5 is a diagram showing an example in which the lines of sight of the eyes of the interactive robot is turned to the conversation partner located on the right side of the photographed image.

The eye control unit 105 controls the lines of sight of the eyes of the interactive robot 200, which are displayed on the display panels 106, respectively, so that they are turned to the position of the face of the conversation partner, based on the position of the face of the conversation partner recognized by the face recognition unit 110. When the position of the face of the conversation partner is moved, the lines of sight of the eyes of the interactive robot 200 are turned in the direction in which the position of the face of the conversation partner is moved. For example, as shown in FIG. 3, when the position of the face of the conversation partner is moved rightward in the photographed image as the conversation partner moves rightward in the photographed image, the lines of sight of the eyes of the interactive robot 200 are turned rightward as shown in FIG. 4. The entire face of the interactive robot 200 at this time has an expression, for example, as shown in FIG. 5.

Note that when a change occurs within a unit time in an area of a predetermined ratio or more of the photographed image during movement of the position of the face of the conversation partner (for example, when 50% or more of the area of the photographed image is changed for T seconds), the eye control unit 105 may increase the speed of turning the lines of sight of the eyes of the interactive robot 200 that are displayed on the display panels 106, respectively, as compared with the case where no change occurs within the unit time in the area of the predetermined ratio or more of the photographed image during movement of the position of the face of the conversation partner.

The voice recognition unit 107 recognizes the voice collected by the microphone 101.

When the voice recognition unit 107 recognizes the voice of the conversation partner, the speech control unit 108 generates a response sentence for the speech voice of the conversation partner. For example, the speech control unit 108 may hold a database in which the content of the speech of the conversation partner is associated with the response sentence corresponding to the speech, and may generate the response sentence corresponding to the content of the speech of the conversation partner by using the database. However, the particular method for generating the response sentence is not essential for the present invention, and various well-known methods can be used.

The speaker 109 outputs the response sentence, which is generated by the speech control unit 108, as a voice.

(1-2) Operation of First Embodiment

Figure 6:
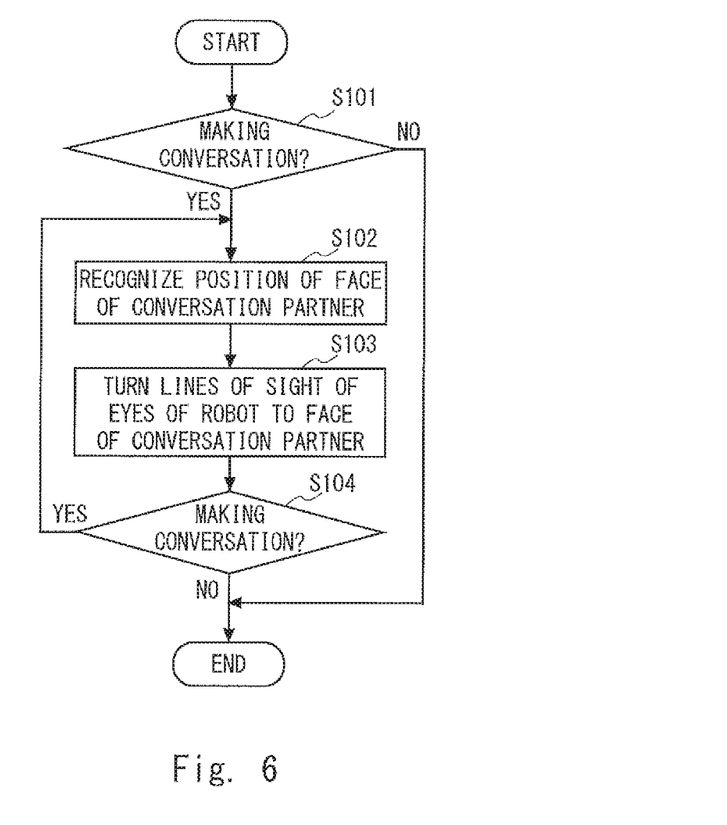
FIG. 6 is a flowchart showing an example of an operation related to control of the eyes of the interactive robot in the voice interaction device according to the first embodiment.

Next, the operation of the first embodiment will be described. FIG. 6 is a flowchart showing an example of the operation related to the control of the eyes of the interactive robot 200 in the voice interaction device 100 according to the first embodiment.

As shown in FIG. 6, first, the interaction determination unit 103 determines whether or not the interactive robot 200 is making conversation with the conversation partner (step S101). When it is not determined that the interactive robot 200 is making conversation with the conversation partner in step S101 (NO in step S101), the process ends.

On the other hand, when it is determined that the interactive robot 200 is making conversation with the conversation partner in step S101 (YES in step S101), the face recognition unit 110 recognizes the position of the face of the conversation partner in the photographed image photographed by the camera 102 (step S102). Subsequently, the eye control unit 105 turns the lines of sight of the eyes of the interactive robot 200 that are displayed on the display panels 106, respectively, to the position of the face of the conversation partner based on the position of the face of the conversation partner recognized by the face recognition unit 110 (step S103). Subsequently, the process proceeds to step S104.

In step S104, the interaction determination unit 103 determines again whether or not the interactive robot 200 is making conversation with the conversation partner. When it is not determined that the interactive robot 200 is making conversation with the conversation partner in step S104 (NO in step S104), the process ends. On the other hand, when it is determined that the interactive robot 200 is making conversation with the conversation partner in step S104 (YES in step S104), the process returns to step S102 to carry out processing of step S102 and subsequent steps.

(1-3) Advantageous Effects of First Embodiment

As described above, in the voice interaction device 100 according to the first embodiment, the eyes of the interactive robot 200 are displayed on the display panels 106, respectively, and the lines of sight of the eyes of the interactive robot 200 that are displayed on the display panels 106, respectively, are turned to the position of the face of the conversation partner. Accordingly, when the lines of sight of the eyes of the interactive robot 200 are turned to the conversation partner, no motor driving sound is generated. This makes it possible to turn the lines of sight of the eyes of the interactive robot 200 to the conversation partner without inhibiting voice interaction.

Further, in the voice interaction device 100 according to the first embodiment, when a change occurs within the unit time in the area of the predetermined ratio or more of the photographed image during movement of the position of the face of the conversation partner, the speed of turning the lines of sight of the eyes of the interactive robot 200 that are displayed on the display panels 106, respectively, to the position of the face of the conversation partner is increased. Accordingly, when a large change occurs in the surrounding environment of the conversation partner, the interactive robot 200 can be caused to make motions like an animal by increasing the speed of moving the lines of sight of the eyes of the interactive robot 200. Therefore, it is possible to give the conversation partner a more realistic feeling that the conversation partner is making conversation with the interactive robot 200, and also give the conversation partner a feeling that the conversation partner is making conversation with an animal-like partner. It is also possible to show the conversation partner that the surrounding environment of the conversation partner is recognized.

Further, in the voice interaction device 100 according to the first embodiment, it is determined whether or not the interactive robot is making conversation with the conversation partner, and only when the interactive robot is making conversation with the conversation partner, the (lines of sight of) eyes of the interactive robot 200 that are displayed on the display panels 106, respectively, are controlled. Thus, since the eyes of the interactive robot are not controlled in the case when the interactive robot is not making conversation with the conversation partner, when the voice interaction device 100 is driven using a battery, the battery life can be improved.

(2) Second Embodiment

In the first embodiment, the lines of sight of the eyes of the interactive robot 200 that are displayed on the display panels 106, respectively, are turned to the position of the face of the conversation partner.

In a second embodiment, when the positions of the eyes of the conversation partner are recognized, the lines of sight of the eyes of the interactive robot 200 that are displayed on the display panels 106, respectively, are directed to the positions of the eyes of the conversation partner.

(2-1) Configuration of Second Embodiment

Figure 7:
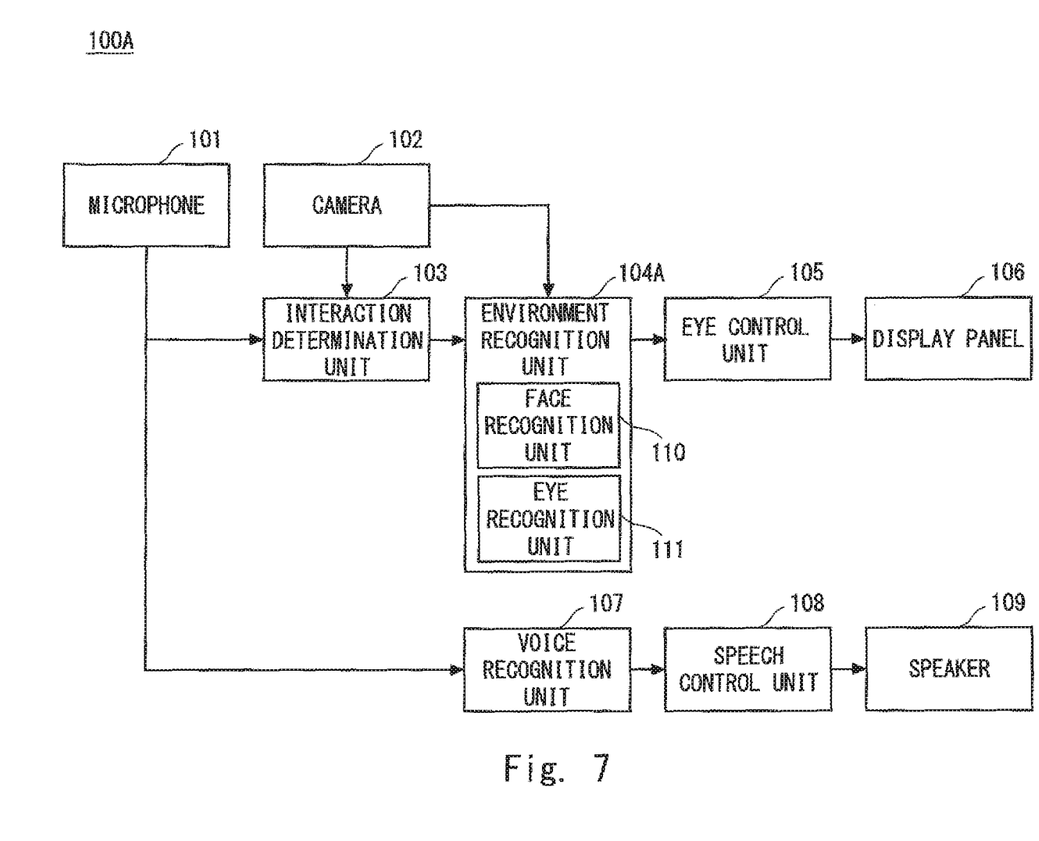
FIG. 7 is a block diagram showing a configuration example of a voice interaction device according to a second embodiment.

First, the configuration of the second embodiment will be described. FIG. 7 is a block diagram showing a configuration example of a voice interaction device 100A according to the second embodiment. Assume that the voice interaction device 100A according to the second embodiment is incorporated in the interactive robot 200 shown in FIG. 2, like the voice interaction device 100 according to the first embodiment.

As shown in FIG. 7, the configuration of the voice interaction device 100A according to the second embodiment differs from the configuration of the voice interaction device 100 according to the first embodiment described above with reference to FIG. 1 in that an environment recognition unit 104A is provided instead of the environment recognition unit 104. The components of the second embodiment whose operations are different from those of the first embodiment will be described below.

The environment recognition unit 104A recognizes not only the position of the face of the conversation partner captured in the photographed image photographed by the camera 102, but also the positions of the eyes of the conversation partner. Accordingly, the environment recognition unit 104A differs from the environment recognition unit 104 in that an eye recognition unit 111, which is an example of a second recognition unit, is added. The eye recognition unit 111 recognizes the positions of the eyes of the conversation partner in the photographed image. The face of the conversation partner is recognized by the face recognition unit 110.

When the positions of the eyes of the conversation partner are recognized by the eye recognition unit 111 and the lines of sight of the eyes of the conversation partner are turned to the interactive robot 200, the eye control unit 105 turns the lines of sight of the eyes of the interactive robot 200 that are displayed on the display panels 106, respectively, to the positions of the eyes of the conversation partner. When the positions of the eyes of the conversation partner are recognized by the eye recognition unit 111 and the lines of sight of the eyes of the conversation partner are not turned in the direction of the interactive robot 200, the eye control unit 105 turns the lines of sight of the eyes of the interactive robot 200 that are displayed on the display panels 106, respectively, to the direction in which the lines of sight of the eyes of the conversation partner are turned for a predetermined period of time (e.g., t1 seconds), and then returns the lines of sight of the eyes of the interactive robot 200 to the positions of the eyes of the conversation partner.

On the other hand, when the positions of the eyes of the conversation partner are not recognized by the eye recognition unit 111, the eye control unit 105 turns the lines of sight of the eyes of the interactive robot 200 that are displayed on the display panels 106, respectively, to the position of the face of the conversation partner.

(2-2) Operation of Second Embodiment

Figure 8:
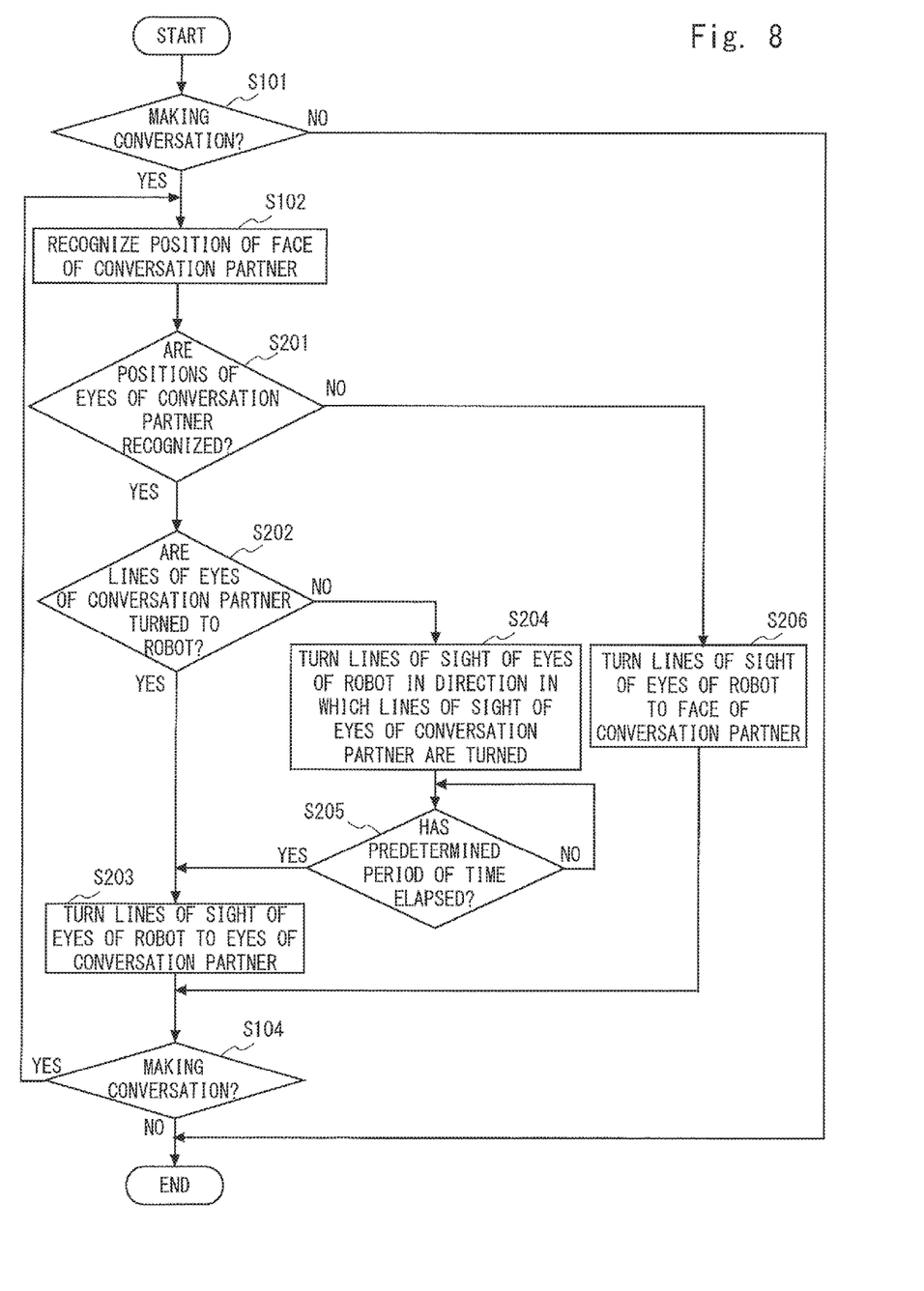
FIG. 8 is a flowchart showing an example of an operation related to control for the eyes of the interactive robot in the voice interaction device according to the second embodiment.

Next, the operation of the second embodiment will be described. FIG. 8 is a flowchart showing an example of the operation related to the control of the eyes of the interactive robot 200 in the voice interaction device 100A according to the second embodiment. Processing shown in FIG. 8 differs from the processing of the first embodiment described above with reference to FIG. 6 in that steps S201 to S206 are provided instead of step S103.

As shown in FIG. 8, processing of steps S101 and S102 which are similar to those of FIG. 6 is first carried out. When it is not determined that the interactive robot is making conversation with the conversation partner in step S101 (NO in step S101), the process ends. On the other hand, when it is determined that the interactive robot is making conversation with the conversation partner in step S101 (YES in step S101), the position of the face of the conversation partner is recognized in step S102, and the process proceeds to step S201.

In step S201, the eye recognition unit 111 attempts to recognize the positions of the eyes of the conversation partner. When the positions of the eyes of the conversation partner are not recognized in step S201 (NO in step S201), the eye control unit 105 turns the lines of sight of the eyes of the interactive robot 200 that are displayed on the display panel 106, respectively, to the position of the face of the conversation partner (step S206). After that, the process proceeds to step S104.

On the other hand, when the positions of the eyes of the conversation partner are recognized in step S201 (YES in step S201), the eye control unit 105 determines whether or not the lines of sight of the eyes of the conversation partner are turned to the interactive robot 200 (step S202). When the lines of sight of the eyes of the conversation partner are turned to the interactive robot 200 in step S202 (YES in step S202), the eye control unit 105 turns the lines of sight of the eyes of the interactive robot 200 that are displayed on the display panel 106, respectively, to the positions of the eyes of the conversation partner (step S203). After that, the process proceeds to step S104.

On the other hand, when the lines of sight of the eyes of the conversation partner are not turned to the interactive robot 200 in step S202 and are not turned in the direction of the interactive robot 200 (NO in step S202), the eye control unit 105 turns the lines of sight of the eyes of the interactive robot 200 that are displayed on the display panels 106, respectively, to the direction in which the lines of sight of the eyes of the conversation partner are turned (step S204). Then, after a lapse of a predetermined period of time (YES in step S205), the eye control unit 105 turns the lines of sight of the eyes of the interactive robot 200 that are displayed on the display panels 106, respectively, to the positions of the eyes of the conversation partner (step S203). After that, the process proceeds to step S104.

After that, processing of step S104 is carried out in the same manner as in FIG. 6. When it is not determined that the interactive robot is making conversation with the conversation partner in step S104 (NO in step S104), the process ends. On the other hand, when it is determined that the interactive robot is making conversation with the conversation partner in step S104 (YES in step S104), the process returns to step S102 to carry out processing of step S102 and subsequent steps.

(2-3) Advantageous Effects of Second Embodiment

As described above, in the voice interaction device 100A according to the second embodiment, when the positions of the eyes of the conversation partner are recognized and the lines of sight of the eyes of the conversation partner are turned to the interactive robot 200, the lines of sight of the eyes of the interactive robot 200 that are displayed on the display panels 106, respectively, are turned to the positions of the eyes of the conversation partner. Further, when the positions of the eyes of the conversation partner are recognized and the lines of sight of the eyes of the conversation partner are not turned in the direction of the interactive robot 200, the voice interaction device 100A turns the lines of sight of the eyes of the interactive robot 200 that are displayed on the display panels 106, respectively, to the direction in which the lines of sight of the eyes of the conversation partner are turned for the predetermined period of time, and then turns the lines of eyes of the interactive robot 200 to the positions of the eyes of the conversation partner. Accordingly, when the conversation partner is preoccupied with something and the lines of sight of the eyes of the conversation partner are not turned to the interactive robot 200, for example, when the conversation partner looks away, the lines of sight of the eyes of the interactive robot 200 can be turned in the direction in which the lines of sight of the eyes of the conversation partner are turned. Further, when the lines of sight of the eyes of the conversation partner are turned to the interactive robot 200, regardless of the orientation of the face of the conversation partner, the lines of sight of the eyes of the interactive robot 200 can be turned to the positions of the eyes of the conversation partner, thereby enabling the interactive robot to steadily look at the eyes of the conversation partner. Thus, it can be made clear that the interactive robot 200 is looking at the conversation partner, which makes it possible to give the conversation partner a more realistic feeling that the conversation partner is making conversation with the animal-like partner. It is also possible to inform the conversation partner that the interactive robot 200 has recognized the behavior of the conversation partner. This provides the conversation partner with a sense of affinity and attachment to the interactive robot 200.

Other advantageous effects of the second embodiment are similar to those of the first embodiment.

(3) Third Embodiment

Since the camera 102 photographs the image of the conversation partner and images in the vicinity of the conversation partner, a person or an object (such as a ball) other than the conversation partner may be captured as a moving object in the photographed image photographed by the camera 102.

In the third embodiment, when a moving object other than the conversation partner is captured in the photographed image, the lines of sight of the eyes of the interactive robot 200 that are displayed on the display panel 106, respectively, are temporarily turned to the position where the moving object is recognized.

(3-1) Configuration of Third Embodiment

Figure 9:
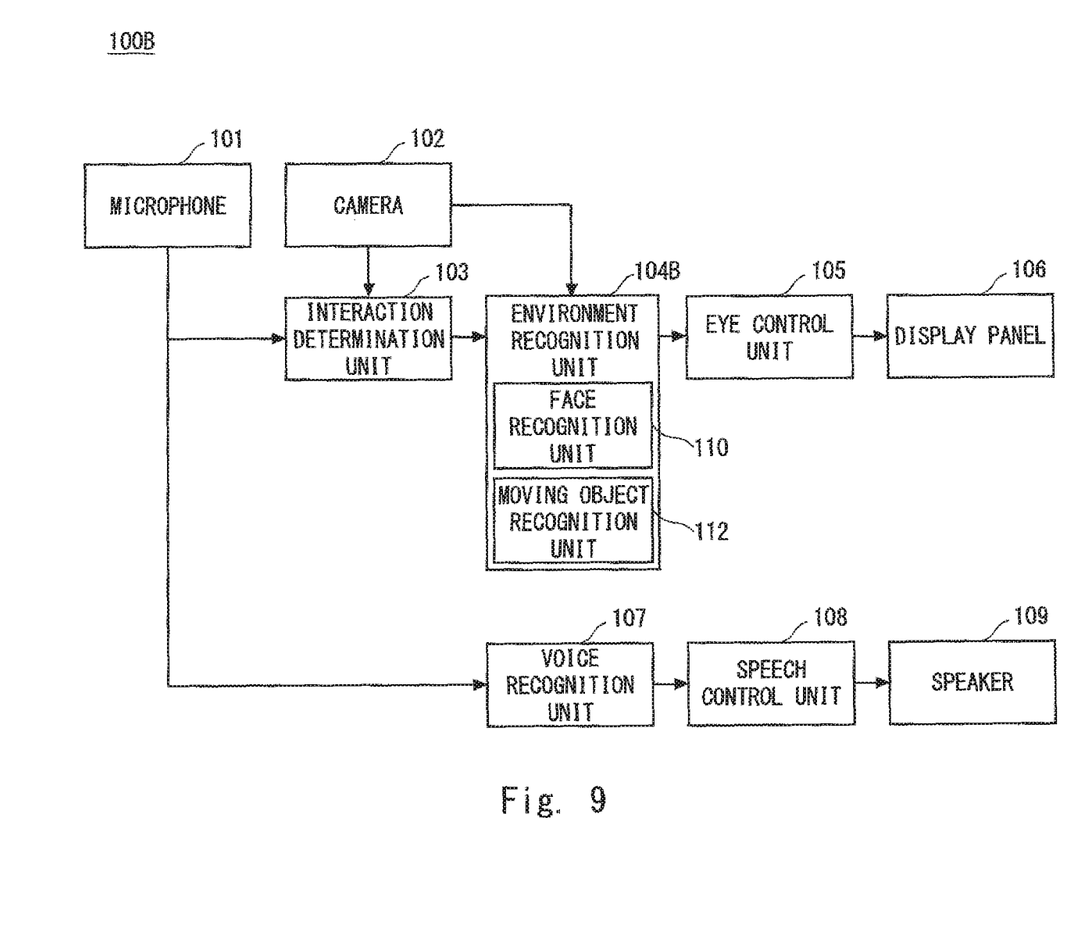
FIG. 9 is a block diagram showing a configuration example of a voice interaction device according to a third embodiment.

First, the configuration of the third embodiment will be described. FIG. 9 is a block diagram showing a configuration example of a voice interaction device 100B according to the third embodiment. The voice interaction device 100B according to the third embodiment is incorporated in, for example, the interactive robot 200 shown in FIG. 2, like the voice interaction device 100 according to the first embodiment.

As shown in FIG. 9, the configuration of the voice interaction device 100B according to the third embodiment differs from the configuration of the voice interaction device 100 according to the first embodiment described above with reference to FIG. 1 in that an environment recognition unit 104B is provided instead of the environment recognition unit 104. The components of the second embodiment whose operations are different from those of the first embodiment will be described below.

The environment recognition unit 104B recognizes not only the position of the face of the conversation partner captured in the photographed image photographed by the camera 102, but also a moving object other than the conversation partner captured in the photographed image. Accordingly, the environment recognition unit 104B differs from the environment recognition unit 104 in that a moving object recognition unit 112, which is an example of a third recognition unit, is added thereto.

When a moving object other than the conversation partner is captured in the photographed image photographed by the camera 102, the moving object recognition unit 112 recognizes the position of the moving object. The moving object is an object that moves, and the moving object includes both a person and an object (such as a ball). When the moving object other than the conversation partner is a person, the moving object recognition unit 112 recognizes the position of the face of the person.

In the case of specifying the conversation partner, the moving object recognition unit 112 may specify, for example, a person in the photographed image when conversation is started, and may continuously track the person. The moving object recognition unit 112 may specify, as the conversation partner, a person whose face is the largest among the faces of the persons in the photographed image (i.e., a person located at a position closest to the interactive robot 200). When determining whether the object in the photographed image is a person or not, the moving object recognition unit 112 may use, for example, a face recognition technique that is used for a digital camera and the like, and if a face feature point can be detected, the moving object recognition unit 112 may determine that the object is a person. In the case of specifying the conversation partner or the moving object, the moving object recognition unit 112 may use a difference between an image of a background (environment in which the interactive robot 200 is installed) photographed in advance by the camera 102 and the image currently being photographed. In other words, the moving object recognition unit 112 may specify the conversation partner in the manner as described above from among the objects obtained as the difference, and may specify an object other than the conversation partner as a moving object.

Figure 10:
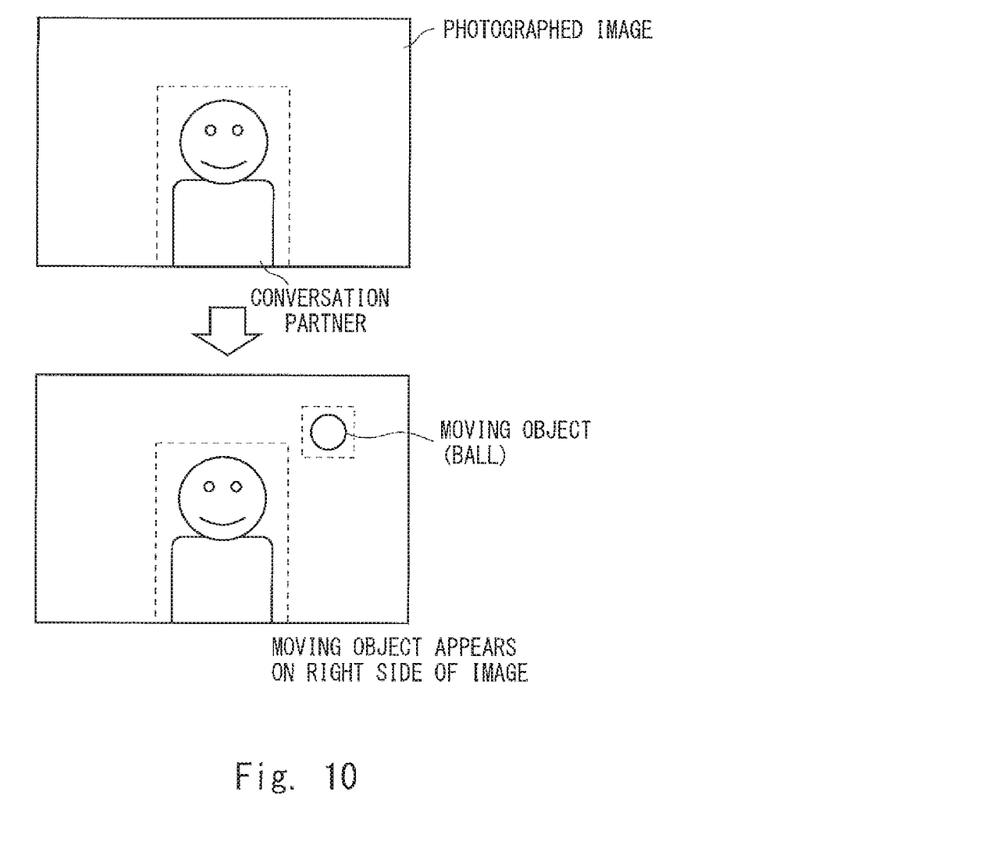
FIG. 10 is a diagram showing an example in which a moving object appears on the right side of a photographed image.
Figure 11:
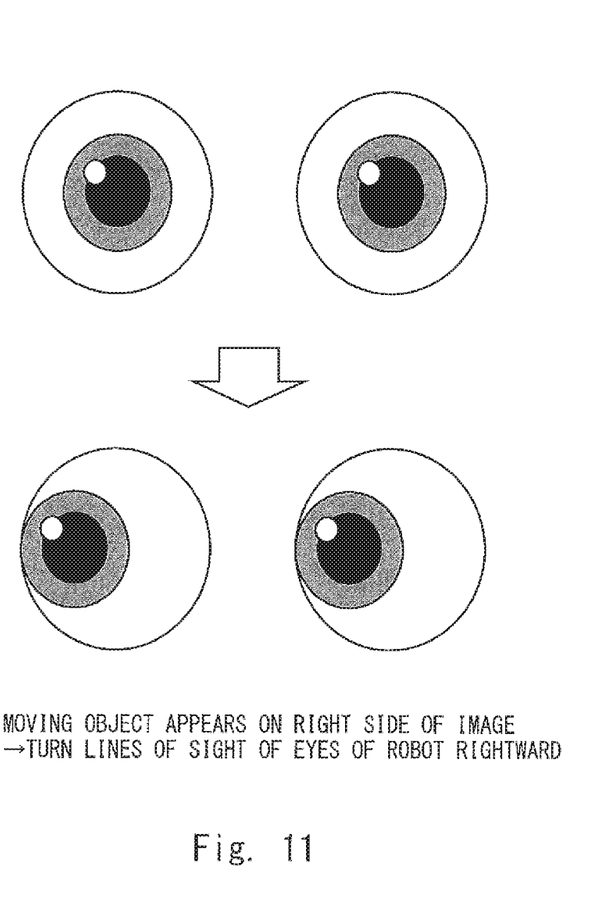
FIG. 11 is a diagram showing an example in which the lines of sight of the eyes of the interactive robot is turned to the moving object located on the right side of the photographed image.

When the position of the moving object other than the conversation partner is recognized by the moving object recognition unit 112, the eye control unit 105 turns the lines of sight of the eyes of the interactive robot 200 that are displayed on the display panels 106, respectively, to the position of the moving object for a predetermined period of time (e.g., t2 seconds), and then returns the lines of sight of the eyes of the interactive robot 200 to the position of the face of the conversation partner. For example, as shown in FIG. 10, when the moving object (ball) is newly captured on the right side of the photographed image, as shown in FIG. 11, the lines of sight of the eyes of the interactive robot 200 are turned rightward. Then, after a lapse of the predetermined period of time, the lines of sight of the eyes of the interactive robot 200 are returned to the position of the face of the conversation partner.

On the other hand, when the position of the moving object other than the conversation partner is not recognized by the moving object recognition unit 112, the eye control unit 105 turns the lines of sight of the eyes of the interactive robot 200 to the position of the face of the conversation partner.

When a moving object other than the conversation partner is newly captured in the photographed image, or when a change occurs within a unit time in the area of the predetermined ratio or more of the photographed image during movement of the moving object (e.g., when 50% or more of the area of the photographed image is changed for T seconds), the eye control unit 105 may increase the speed of turning the lines of sight of the eyes of the interactive robot 200 that are displayed on the display panels 106, respectively, as compared with the case where no change occurs within the unit time in the area of the predetermined ratio or more of the photographed image during movement of the position of the moving object.

(3-2) Operation of Third Embodiment

Figure 12:
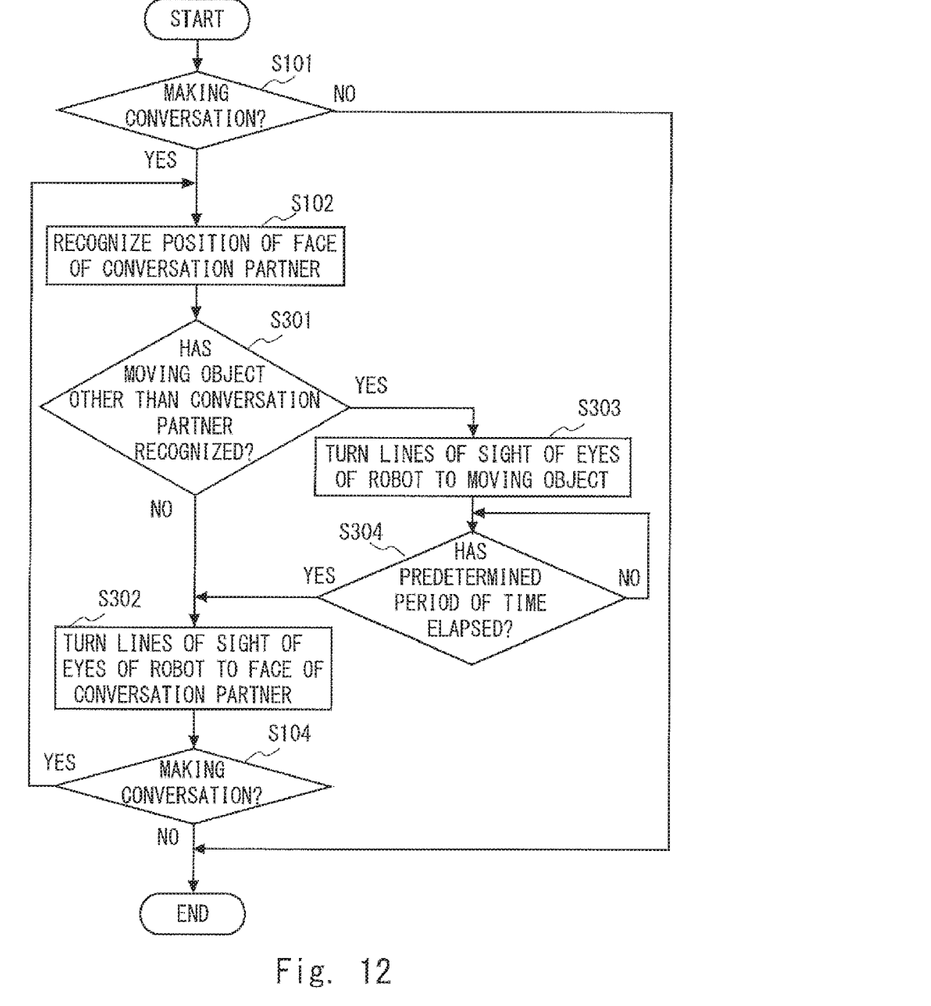
FIG. 12 is a flowchart showing an example of an operation related to control for the eyes of the interactive robot in the voice interaction device according to the third embodiment.

Next, the operation of the third embodiment will be described. FIG. 12 is a flowchart showing an example of the operation related to the control of the eyes of the interactive robot 200 in the voice interaction device 100B according to the third embodiment. Processing shown in FIG. 12 differs from the processing in the first embodiment described above with reference to FIG. 6 in that steps S301 to S304 are provided instead of step S103.

As shown in FIG. 12, processing of steps S101 and S102 which are similar to those of FIG. 6 is first carried out. When it is not determined that the interactive robot is making conversation with the conversation partner in step S101 (NO in step S101), the process ends. On the other hand, when it is determined that the interactive robot is making conversation with the conversation partner in step S101 (YES in step S101), the position of the face of the conversation partner is recognized in step S102 and the process proceeds to step S301.

In step S301, when a moving object other than the conversation partner is captured in the photographed image, the moving object recognition unit 112 recognizes the position of the moving object. When the position of the moving object other than the conversation partner is not recognized in step S301 (NO in step S301), the eye control unit 105 turns the lines of sight of the eyes of the interactive robot 200 that are displayed on the display panels 106, respectively, to the position of the face of the conversation partner (step S302). After that, the process proceeds to step S104.

On the other hand, when the position of the moving object other than the conversation partner is recognized in step S301 (YES in step S301), the eye control unit 105 turns the lines of sight of the eyes of the interactive robot 200 that are displayed on the display panels 106, respectively, to the position of the moving object (step S303). Then, after a lapse of the predetermined period of time (YES in step S304), the eye control unit 105 turns the lines of sight of the eyes of the interactive robot 200 that are displayed on the display panels 106, respectively, to the position of the face of the conversation partner (step S302). After that, the process proceeds to step S104.

After that, processing of step S104 which is similar to that of FIG. 6 is carried out. When it is not determined that the interactive robot is making conversation with the conversation partner in step S104 (NO in step S104), the process ends. On the other hand, when it is determined that the interactive robot is making conversation with the conversation partner in step S104 (YES in step S104), the process returns to step S102 and processing of step S102 and subsequent steps is carried out.

(3-3) Advantageous Effects of Third Embodiment

As described above, when a moving object other than the conversation partner is captured in the photographed image, the voice interaction device 100B according to the third embodiment recognizes the position of the moving object, turns the lines of sight of the eyes of the interactive robot 200 that are displayed on the display panels 106, respectively, to the position of the moving object for a predetermined period of time, and then returns the lines of sight of the eyes of the interactive robot 200 to the position of the face of the conversation partner. Accordingly, the interactive robot 200 can make motions like an animal in such a manner that the lines of sight of the eyes of the interactive robot are moved in response to a change in the surrounding environment of the conversation partner, without excessively reducing the time for the interactive robot to look at the conversation partner. This makes it possible to give the conversation partner a more realistic feeling that the conversation partner is making conversation with the animal-like partner. It is also possible to inform the conversation partner that the surrounding environment of the conversation partner is recognized.

Further, in the voice interaction device 100B according to the third embodiment, when a moving object is newly captured in the photographed image, or when a change occurs within a unit time in the area of the predetermined ratio or more of the photographed image during movement of the moving object, the speed of turning the lines of sight of the eyes of the interactive robot 200 that are displayed on the display panels 106, respectively, to the position of the moving object is increased. Accordingly, when a large change occurs in the surrounding environment of the conversation partner, the interactive robot 200 can make motions like an animal by increasing the speed of turning the lines of sight of the eyes of the interactive robot 200. This makes it possible to give the conversation partner a more realistic feeling that the conversation partner is making conversation with the animal-like partner.

Other advantages effects are similar to those of the first embodiment.

Note that the present invention is not limited to the above embodiments and can be modified as appropriate without departing from the scope of the invention. For example, the above embodiments have been described as independent embodiments, but instead may be combined as appropriate. Specifically, the second and third embodiments may be combined.

Further, the voice interaction device recognizes the position of the face of the conversation partner, except for the case where the positions of the eyes of the conversation partner are recognized in the second embodiment, and turns the lines of sight of the eyes of the interactive robot that are displayed on the display panels, respectively, to the position of the face of the conversation partner. However, the present invention is not limited to this example. The lines of sight of the eyes of the interactive robot may be turned to the position of any region of the conversation partner. Specifically, the voice interaction device may recognize the position of any region of the conversation partner, and may turn the lines of sight of the eyes of the interactive robot to the position where the conversation partner is recognized.

When the volume of sound collected by the microphone exceeds a threshold and the conversation partner is captured in the photographed image photographed by the camera, the voice interaction device determines that the interactive robot is making conversation with the conversation partner and controls the eyes of the interactive robot only when it is determined that the interactive robot is making conversation with the conversation partner. However, the present invention is not limited to this example. The generation of a response sentence in response to the speech voice of the conversation partner and the voice output may also be carried out only when it is determined that the interactive robot is making conversation with the conversation partner.

When the lines of sight of the eyes of the interactive robot are turned to the position where the conversation partner is recognized during movement of the conversation partner, the voice interaction device may change the expression of the eyes that are displayed on the display panels, respectively, depending on whether or not the conversation partner is making a speech. For example, when the conversation partner has moved without making any speech, the lines of sight of the eyes of the interactive robot may be turned to the conversation partner by causing the interactive robot to blink more often than when the conversation partner has moved while making a speech. This allows the interactive robot to express a feeling that the interactive robot intends to confirm the next behavior of the conversation partner.

Further, the voice interaction device may include a function for estimating an azimuth of a sound source that has generated sound. When noise other than the speech voice of the conversation partner is generated, the voice interaction device including this function may turn the lines of sight of the eyes of the interactive robot that are displayed on the display panels, respectively, to the azimuth direction of the noise sound source. Further, in this case, the speed of turning the lines of sight of the eyes of the interactive robot may be increased, regardless of whether the moving object is present in the azimuth direction of the sound source. This allows the interactive robot to make motions like an animal such that the interactive robot is surprised at the sound when noise is generated.

Figure 13:
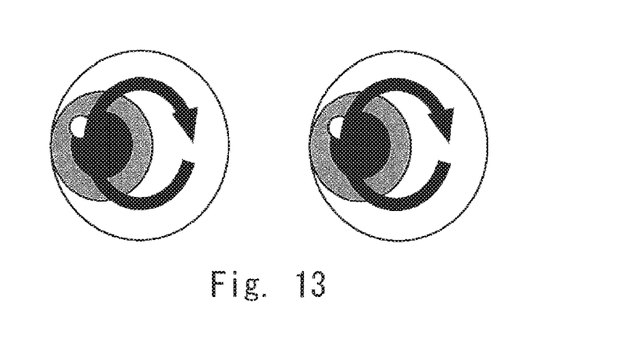
FIG. 13 is a diagram showing an example where the eyes of the interactive robot are rolled.

In a case where the conversation partner has moved to a position outside of the range of the photographed image when it is determined that the interactive robot is making conversation with the conversation partner, the voice interaction device may allow the interactive robot to make motions in such a manner that the interactive robot rolls its eyes, which are displayed on the display panels, respectively, for example, as shown in FIG. 13, so as to show that the interactive robot is searching the conversation partner. In this case, since the lines of sight of the eyes of the interactive robot cannot be turned to the conversation partner, the operation of controlling the eyes may be stopped.

The components other than the microphone, the camera, the display panels, and the speaker, which are included in the voice interaction device, can be implemented by, for example, a processor (not shown) and a memory (not shown) which are included in a computer. Specifically, the components can be implemented by causing the processor to read out software (program) from the memory and execute the software. Further, the implementation of the components is not limited to the software implementation using a program, but instead the components may be implemented by, for example, any combination of hardware, firmware, and software.

The above-mentioned computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-recordable), CD-R/W (CD-rewritable), and semiconductor memories (such as mask ROM, PROM (Programmable ROM), EPROM (Erasable PROM), flash ROM, RAM (Random Access Memory), etc.).

The above-mentioned program may be provided to a computer using any type of transitory computer readable media. Examples of transitory computer readable media include electric signals, optical signals, and electromagnetic waves. Transitory computer readable media can provide the program to a computer via a wired communication line, such as an electric wire and an optical fiber, or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice interaction device that is incorporated in an interactive robot, comprising:
   a camera configured to take a photograph of an image;
   a display disposed at positions of eyes of the interactive robot and configured to display the eyes of the interactive robot; and
   a processor configured to
      recognize a position of a conversation partner captured in the image;
      turn lines of sight of the eyes of the interactive robot displayed on the display to a position where the conversation partner is recognized,
      recognize a position of a face of the conversation partner captured in the image; and
      recognize positions of eyes of the conversation partner captured in the image,
   when the positions of the eyes of the conversation partner are recognized, if the lines of sight of the eyes of the conversation partner are turned to the interactive robot, the lines of sight of the eyes of the interactive robot displayed on the display are turned to the positions of the eyes of the conversation partner, and
   when the positions of the eyes of the conversation partner are not recognized, the lines of sight of the eyes of the interactive robot displayed on the display are turned to the position of the face of the conversation partner.

2. The voice interaction device according to claim 1, wherein when the positions of the eyes of the conversation partner are recognized, if the lines of sight of the eyes of the conversation partner are not turned in the direction of the interactive robot, the lines of sight of the eyes of the interactive robot displayed on the display are turned to the direction in which the lines of sight of the eyes of the conversation partner are turned for a predetermined period of time, and then the lines of sight of the eyes of the interactive robot are turned to the positions of the eyes of the conversation partner.

3. The voice interaction device according to claim 1, wherein when a change occurs in a unit time within an area of a predetermined ratio or more of the image during movement of the conversation partner, a speed of turning the lines of sight of the eyes of the interactive robot displayed on the display to the position where the conversation partner is recognized increases, as compared to a case where no change occurs in the unit time within the area of the predetermined ratio or more of the image during movement of the conversation partner.

4. The voice interaction device according to claim 1, wherein
   the processor is further configured to recognize a position of a moving object other than the conversation partner that is captured in the image, and
   when the moving object is captured in the image, for a predetermined period of time, the lines of sight of the eyes of the interactive robot displayed on the display turns to the position where the moving object is recognized, and then the lines of sight returns to the position where the conversation partner is recognized.

5. The voice interaction device according to claim 4, wherein when the moving object is newly captured in the image and when a change occurs in a unit time within an area of a predetermined ratio or more of the image during movement of the moving object, a speed of turning the lines of sight of the eyes of the interactive robot displayed on the display to the position where the moving object is recognized increases, as compared to a case where no change occurs in the unit time within the area of the predetermined ratio or more of the image during movement of the moving object.

6. A control method for a voice interaction device incorporated in an interactive robot, the control method comprising:
   taking a photograph of an image;
   recognizing a position of a conversation partner captured in the image; and
   turning lines of sight of eyes of the interactive robot to a position where the conversation partner is recognized, the eyes of the interactive robot being displayed on a display disposed at positions of the eyes of the interactive robot,
   wherein the recognizing the position of the conversation partner includes:
      recognizing a position of a face of the conversation partner captured in the image; and
      recognizing positions of eyes of the conversation partner captured in the image,
   in the turning the lines of sight of the eyes of the interactive robot, when the positions of the eyes of the conversation partner are recognized, if the lines of sight of the eyes of the conversation partner are turned to the interactive robot, the lines of sight of the eyes of the interactive robot displayed on the display are turned to the positions of the eyes of the conversation partner, and
   in the turning the lines of sight of the eyes of the interactive robot, when the positions of the eyes of the conversation partner are not recognized, the lines of sight of the eyes of the interactive robot displayed on the display are turned to the position of the face of the conversation partner.

* * * * *